Sept. 30, 1952 P. M. WAITE 2,612,058
IRREVERSIBLE THROTTLE CONTROL
Filed Oct. 3, 1950 3 Sheets-Sheet 2
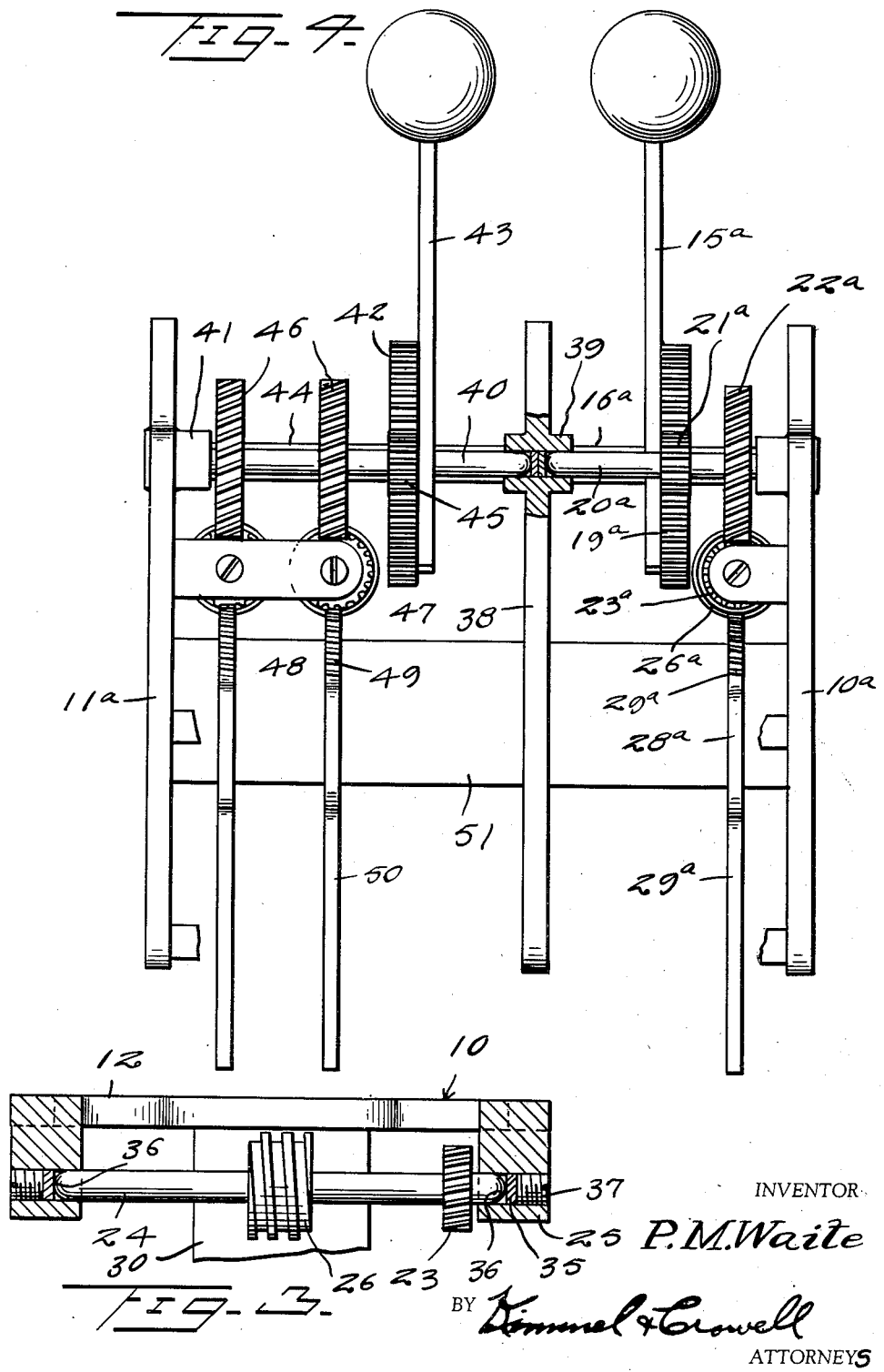
INVENTOR
P. M. Waite
BY Kimmel & Crowell
ATTORNEYS

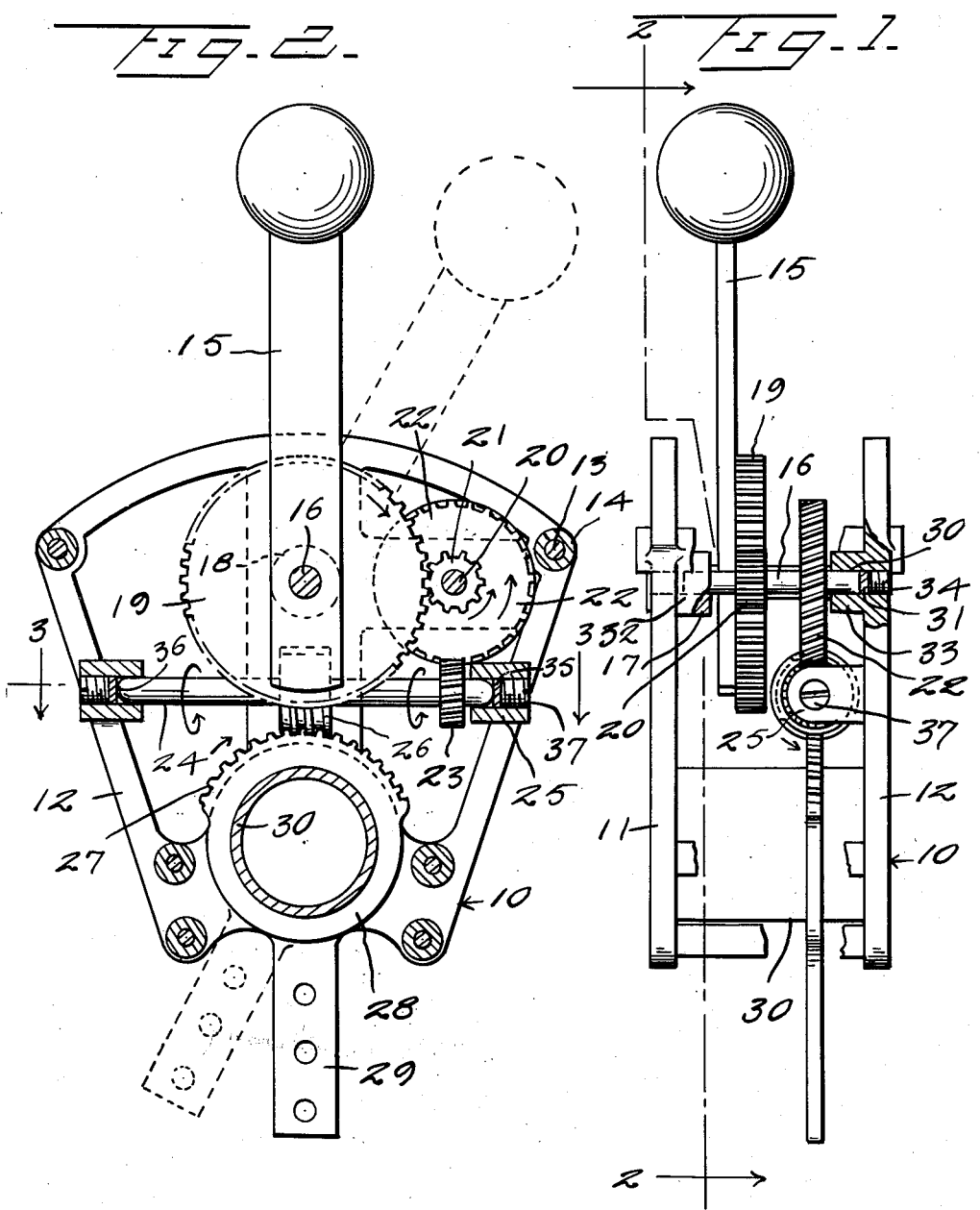

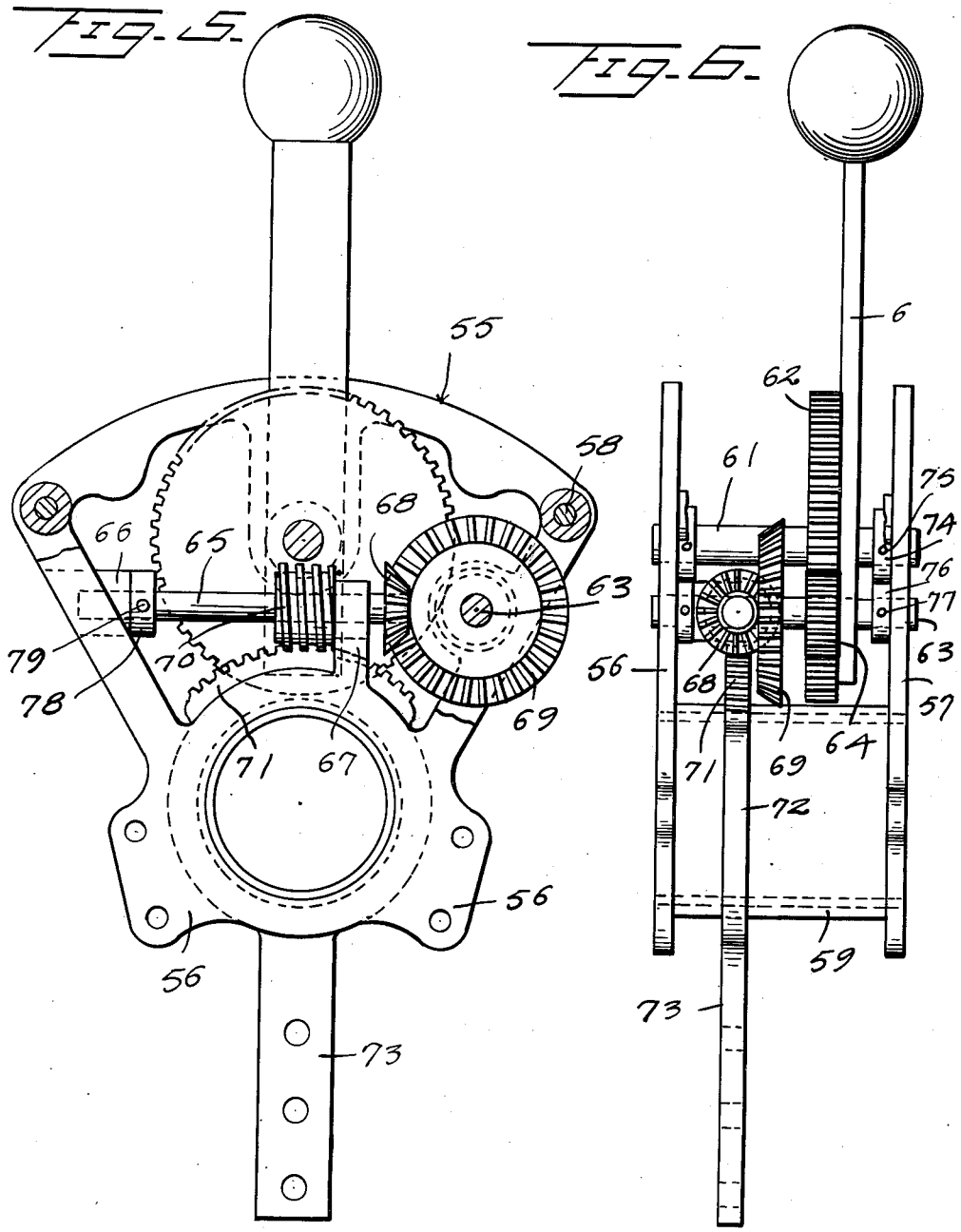

Patented Sept. 30, 1952

2,612,058

UNITED STATES PATENT OFFICE 2,612,058

IRREVERSIBLE THROTTLE CONTROL

Philip M. Waite, Corry, Pa.

Application October 3, 1950, Serial No. 188,103

1 Claim. (Cl. 74—491)

This invention relates to an irreversible throttle control for internal combustion engines or the like.

An object of this invention is to provide a throttle control for engines such as airplane engines, boat engines, or the like, which subject the airplane or boat or other applications to vibration of a character sufficient to effect a creeping of the control elements, which is so constructed that the control elements will be rigidly held against movement from vibrations, but may be readily adjusted by the operator. Also it will be noted that the control is irreversible against loads, either by themselves or in combination with vibration.

Another object of this invention is to provide a control of this kind which is compact in assembly and will eliminate any creeping of the master lever by vibration which is communicated to the driven or slave lever.

Another object of this invention is to provide a control of this kind which will permit a relatively wide range of movement of either the master lever or the driven or slave lever, and this movement may be equal as to both levers or may be unequal with an accelerated or decelerated movement as to the slave or driven lever.

With the above and other objects in view, my invention consists in the arrangement, combination and details of construction disclosed in the drawings and specification, and then more particularly pointed out in the appended claim.

In the drawings:

Figure 1 is a detail side elevation partly broken away of a throttle control constructed according to an embodiment of this invention.

Figure 2 is a sectional view taken on the line 2—2 of Figure 1.

Figure 3 is a sectional view taken on the line 3—3 of Figure 1.

Figure 4 is a diagrammatic view showing a multiple control device embodying this invention.

Figure 5 is a detailed front elevation partly broken away and in section of a modified form of this invention.

Figure 6 is a detailed side elevation of the device shown in Figure 5.

Referring to the drawings, and first to Figures 1, 2, and 3, the numeral 10 designates generally a frame structure which is formed of a pair of plates 11 and 12 which are connected together by means of bolts 13 which extend through spacer sleeves 14. A master or driving lever 15 is fixed on a shaft 16 which is journalled in bearings 17 and 18 carried by the frame members 11 and 12, and the shaft 16 also has fixed thereon a spur gear 19.

A second shaft 20 is also journalled between the frame members 12 being disposed parallel with shaft 16, and a spur gear 21 is fixed on shaft 20 and meshes with gear 19.

A helical gear 22 is also fixed on shaft 20 and meshes with a helical gear 23 which is fixed on a horizontally disposed shaft 24. The shaft 24 is journalled in bearing members 25 which are carried by the frame member 12 and is disposed at right angles to and below the two shafts 16 and 20. The shaft 24 has mounted thereon a worm 26 which meshes with a fragmentary worm gear 27 carried by a bearing bushing 28 formed on the upper end of a slave or driven lever 29. The bushing 28 is rotatably mounted on a tubular member 30 which is fixedly secured between the lower portions of the frame members 11 and 12.

The shaft 20 is formed with rounded opposite ends 30 which bear against thrust washers or discs 31 mounted with the bearings 32 and 33 for the shaft 20. A screw plug 34 is threaded in each of the bearings 32 and 33 and bears against the thrust member 31 so that the shaft 20 may be adjusted endwise to an accurate degree. The bearings 25 for the worm shaft 24 also have thrust members 35 disposed therein which bear against the rounded ends 36 of the shaft 24. Screw plugs 37 threaded in the bearings 25 provide for endwise adjustment of the shaft 24.

Referring now to Figure 4, there is disclosed a modified form of this invention embodying a series of master and slave levers. The frame 10a has journalled therein a shaft 16a and a master lever 15a is fixed on the shaft 16a. A spur gear 19a is fixed on shaft 16a and meshes with a small spur gear 21a which is fixed on a shaft 20a. Shaft 20a is parallel with shaft 16a, and a helical gear 22a is fixed on shaft 20a. Gear 22a meshes with a second helical gear 23a which is secured to a worm shaft disposed at right angles to the two shafts 16a and 20a.

A worm 26a is secured to the worm shaft similar to worm 26 and meshes with a fragmentary worm gear 27a carried by the bushing or ring 28a formed on the upper end of the slave or driven lever 29a. An intermediate frame member 38 is disposed within the frame 10a and is formed with a bearing box 39 within which one end of the shaft 20a rotatably engages.

A second helical gear shaft 40 is disposed in axial alignment with shaft 20a and is rotatable in bearing boss 39 and in a bearing boss 41 carried by end member 11a of frame 10a.

A spur gear 42 similar to gear 19a is fixed on a shaft 44, and a master lever 43 is fixed relative to the gear 42. Shaft 44 is disposed in axial alignment with shaft 16a and is journalled between intermediate frame member 38 and end frame member 11a. A spur gear 45 is fixed on shaft 40, and shaft 40 also has fixed thereon a pair of helical gears 46. The helical gears 46 mesh with helical gears 47 mounted on worm shafts disposed in parallel relation to each other, but at right angles to shafts 40 and 44.

The worm shafts have fixed thereon a pair of worms 48 which mesh with fragmentary worm gears 49 formed on a pair of slave lever members 50. The levers 28a and 50 are rotatable on a tubular stationary shaft 51 which is fixed between the ends of frame 10a.

Referring now to Figures 5 and 6 there is disclosed a modified form of this invention embodying a frame structure 55 formed of plates 56 and 57 secured together by fastening means 58. A fixed tubular shaft 59 is secured between the plates 56 and 57 and forms a fixed pivot member for the driven or slave lever. A master lever 60 is fixed on a shaft 61 journalled between the frame members 56 and 57, and a large spur gear 62 is fixed relative to the shaft 61 and the lever 60.

A second shaft 63 is journalled between the frame members 56 and 57 being parallel with the shaft 61. The shaft 63 has fixed thereto a small spur gear 64 which meshes with gear 62.

A right angularly disposed shaft 65 is journalled in bearings 66 and 67 carried by the frame member 56, and shaft 65 has fixed thereon a beveled gear 68 which meshes with a large beveled gear 69 fixed on shaft 63. Shaft 65 also has fixed thereon a worm 70 which meshes with a fragmentary worm gear 71 formed on the annular hub 72 of a slave or driven lever 73. The hub 72 is rotatable on the fixed tubular shaft 59. A shaft 61 is held against endwise movement by means of a pair of collars 74 secured by set screws 75 and shaft 63 is held against endwise movement by means of a pair of collars 76 secured by set screws 77.

A collar 78 is mounted on shaft 65 and secured by means of a set screw 79 and bears against outer bearing 66. Worm 70 bears against bearing 67 so that shaft 65 is held against endwise movement in either direction.

It will be understood that where a plurality of master and driven or slave levers are desired the beveled gear structure shown in Figures 5 and 6 may be substituted for the helical gears shown in Figure 4. As will be evident the several shafts carrying the levers and gears hereinbefore described may be held against endwise movement by thrust washers adjusted by means of screw plugs, or the shafts may be held against endwise movement by means of collars which are adjustably secured to the shafts.

In the use and operation of this device the frame structure 10 is mounted at a convenient location to the operator of an airplane or boat, and the slave or driven member 29 is connected with the throttle or other suitable element of the engine. The gear train embodying the gears 19, 20, 22, 23, 26, and 27 is so constructed and arranged that the frame members 11 and 12 may be positioned relatively close together. This gear train may be formed of any desired gear ratio so that the slave or driven lever 29 may be swung in an arc equal to the arc of master lever 15, or the gear train may have a ratio which will provide for either acceleration or deceleration of the slave lever with respect to the master lever.

Due to the worm and worm gear connection hereinbefore described the slave or driven lever 29 will be locked against rocking by any strain applied thereto except from the master lever 15.

The device hereinbefore described will provide a control means which can be made instantly active and will not require any latching or other locking means to hold the slave or driven lever in a fixed position. Where the device is mounted in an airplane the pilot can easily and quickly shift the master lever to any desired position with a single motion.

What is claimed is:

An irreversible engine control comprising a frame formed of a pair of frame plates, a pair of spacer members between said plates, bolts extending through said spacer members securing said plates in spaced apart parallel relation, a tubular shaft between the lower portion of said plates and cooperating with said spacer members in holding said plates in spaced apart relation, a drive shaft journalled in said frame above and parallel with said tubular shaft, a driving lever fixed on said drive shaft, an intermediate shaft journalled in said frame parallel with said drive and tubular shafts, a worm shaft journalled in one of said plates and disposed at right angles to said drive and tubular shafts, a relatively large drive gear fixed on said drive shaft, a relatively small intermediate gear fixed on said intermediate shaft and meshing with said drive gear, a relatively large beveled gear fixed on said intermediate shaft, a relatively small beveled gear fixed on said worm shaft and meshing with said large beveled gear, a worm fixed on said worm shaft, a slave lever rockably mounted on said tubular shaft, and a worm gear fixed to said slave lever and meshing with said worm.

PHILIP M. WAITE.

REFERENCES CITED

The following references are of record in the file of this patent:

UNITED STATES PATENTS

| Number | Name | Date |
|---|---|---|
| 1,560,421 | Griffin | Nov. 3, 1925 |

FOREIGN PATENTS

| Number | Country | Date |
|---|---|---|
| 358,324 | Italy | Apr. 12, 1938 |